US009149865B2

(12) United States Patent
Smeets et al.

(10) Patent No.: US 9,149,865 B2
(45) Date of Patent: Oct. 6, 2015

(54) METHOD FOR MANUFACTURING MICRO GAS TURBINE

(75) Inventors: Paulus Maria Smeets, Tilburg (NL); Savad Shakariyants, s-Hertogenbosch (NL)

(73) Assignee: Micro Turbine Technology, BV, Eindhoven (NL)

(*) Notice: Subject to any disclaimer, the term of this patent is extended or adjusted under 35 U.S.C. 154(b) by 283 days.

(21) Appl. No.: 13/386,562

(22) PCT Filed: Jul. 23, 2010

(86) PCT No.: PCT/NL2010/050479
§ 371 (c)(1), (2), (4) Date: Apr. 2, 2012

(87) PCT Pub. No.: WO2011/010926
PCT Pub. Date: Jan. 27, 2011

(65) Prior Publication Data

US 2013/0199041 A1 Aug. 8, 2013

(30) Foreign Application Priority Data

Jul. 23, 2009 (NL) .................................... 2003264

(51) Int. Cl.
*F02B 57/04* (2006.01)
*H02K 7/18* (2006.01)
(Continued)

(52) U.S. Cl.
CPC ................ *B21K 25/00* (2013.01); *F01D 25/24* (2013.01); *F05D 2220/40* (2013.01); *F05D 2230/80* (2013.01); *F05D 2250/82* (2013.01); *Y10T 29/49323* (2015.01)

(58) Field of Classification Search
CPC ... B21K 25/00; F01D 25/24; Y10T 29/49323; F05D 2220/40; F05D 2250/82; F05D 2230/80
USPC ................ 29/889.22, 889.2, 401.1; 290/1 A; 415/229
See application file for complete search history.

(56) References Cited

U.S. PATENT DOCUMENTS 4,253,031 A 2/1981 Frister
5,497,615 A * 3/1996 Noe et al. .................. 60/39.511
(Continued)

FOREIGN PATENT DOCUMENTS

EP 1564379 8/2005
JP 2004232532 A * 8/2004 ............... F01D 5/02
WO WO03095814 11/2003

OTHER PUBLICATIONS

English Machine Translation of JP 2004-232532.*

*Primary Examiner* — Essama Omgba
*Assistant Examiner* — Darrell C Ford
(74) *Attorney, Agent, or Firm* — Eric Karich; Karich & Associates

(57) ABSTRACT

A method for manufacturing an inexpensive micro gas turbine has an existing compressor-turbine unit divided into two separate parts being a compressor and a turbine. The compressor and turbine shafts are joined. Two existing bearing units are taken, wherein one of them may belong to the existing compressor-turbine unit. The rotor of an existing generator is mounted on the joined shaft. A generator housing is manufactured and connected to the bearing units. The stator of an existing generator is mounted into the generator housing. Energy input into the working cycle of the gas turbine can be implemented by adding either an internal burner or external burner with a heat exchanger. By using inexpensive and often mass produced off-the-shelf components, a cost effective micro gas turbine can be derived.

2 Claims, 1 Drawing Sheet

(51) Int. Cl.
*B21K 25/00* (2006.01)
*F01D 25/24* (2006.01)

(56) References Cited

U.S. PATENT DOCUMENTS

| | | | | |
|---|---|---|---|---|
| 5,836,150 | A * | 11/1998 | Garcia | 60/256 |
| 5,874,798 | A * | 2/1999 | Wiegele et al. | 310/168 |
| 5,932,940 | A * | 8/1999 | Epstein et al. | 310/40 MM |
| 6,047,540 | A * | 4/2000 | Dev | 60/805 |
| 6,255,010 | B1 * | 7/2001 | George et al. | 429/434 |
| 6,392,313 | B1 * | 5/2002 | Epstein et al. | 290/52 |
| 6,679,433 | B2 * | 1/2004 | Gordon et al. | 237/12.1 |
| 6,691,519 | B2 * | 2/2004 | Little | 60/798 |
| 6,748,742 | B2 * | 6/2004 | Rouse et al. | 60/611 |
| 6,815,932 | B2 * | 11/2004 | Wall | 322/20 |
| 6,866,478 | B2 * | 3/2005 | Fabian et al. | 415/198.1 |
| 6,921,207 | B2 * | 7/2005 | Matsunaga | 384/103 |
| 7,492,051 | B1 * | 2/2009 | Chung | 290/1 A |
| 7,555,891 | B2 * | 7/2009 | Muller et al. | 60/39.45 |
| 7,839,040 | B2 * | 11/2010 | Hayasaka et al. | 310/156.28 |
| 7,841,182 | B2 * | 11/2010 | Martin | 60/752 |
| 7,934,368 | B2 * | 5/2011 | Muller et al. | 60/39.45 |
| 8,096,747 | B2 * | 1/2012 | Sengar et al. | 415/1 |
| 8,169,100 | B2 * | 5/2012 | Dooley | 290/46 |
| 8,858,172 | B2 * | 10/2014 | Kurihara et al. | 415/229 |
| 8,936,431 | B2 * | 1/2015 | Chouhan et al. | 415/168.4 |
| 2003/0205213 | A1 * | 11/2003 | Aquino et al. | 123/241 |
| 2004/0040313 | A1 * | 3/2004 | Kurokawa et al. | 60/796 |
| 2005/0042105 | A1 * | 2/2005 | Nishiyama et al. | 416/183 |
| 2005/0189772 | A1 * | 9/2005 | Gozdawa | 290/52 |
| 2006/0087294 | A1 * | 4/2006 | Kataoka et al. | 323/201 |
| 2006/0220388 | A1 | 10/2006 | Teets et al. | |
| 2008/0000238 | A1 * | 1/2008 | Ribaud et al. | 60/804 |
| 2008/0216461 | A1 * | 9/2008 | Nakano et al. | 60/39.53 |
| 2009/0160282 | A1 * | 6/2009 | Hayasaka et al. | 310/156.28 |
| 2009/0226308 | A1 * | 9/2009 | Vandor | 415/178 |
| 2009/0301091 | A1 * | 12/2009 | Engle et al. | 60/734 |
| 2011/0107763 | A1 * | 5/2011 | Gordon et al. | 60/737 |
| 2013/0074516 | A1 * | 3/2013 | Heward et al. | 60/786 |
| 2013/0269348 | A1 * | 10/2013 | Ethier et al. | 60/722 |
| 2014/0125066 | A1 * | 5/2014 | Baumgart et al. | 290/1 A |
| 2014/0314556 | A1 * | 10/2014 | Fremont et al. | 415/200 |
| 2014/0341732 | A1 * | 11/2014 | Friedrich, Peter | 415/229 |
| 2014/0360193 | A1 * | 12/2014 | Stoia et al. | 60/722 |
| 2015/0054288 | A1 * | 2/2015 | Willimczik | 290/1 A |

* cited by examiner

METHOD FOR MANUFACTURING MICRO GAS TURBINE

TECHNICAL FILED OF THE INVENTION

The invention relates to a method for manufacturing a micro gas turbine comprising a compressor, a turbine and a generator driven by the turbine for generating electrical power. To implement energy input into the working cycle, the micro gas turbine can incorporate either an internal burner, external burner with a heat exchanger or other means. The micro gas turbine can also incorporate a recuperator, intercooler, supplementary burner and other customary means to increase efficiency, thermal power, shaft and electrical power, as well as otherwise optimize the performance.

The invention relates to a micro gas turbine for:

- Electrical power generation systems.
- The use in combined heat and electrical power systems, wherein the gas turbine drives an electrical generator to produce electrical power, and the heat in the gas turbine exhaust is—optionally—utilized for heating, such as residential heating, water heating, etc. The heat can be also utilized to produce cooling.
- The use in various heat and power systems in combination with other energy conversion devices, such as fuel cells, Rankine engines, etc.
- The use in auxiliary systems in automotive, maritime and other vehicles.

There is a great potential for employing micro gas turbines in an electrical power range from 1 kW to 300 kW. In particular, micro gas turbines are environmentally and cost effective for distributed power and/or heat and/or cooling generation in households, hotels, farms, restaurants, offices, etc., as well as for vehicular applications. However, the costs of the design, development and manufacturing of micro gas turbines are very high. The costs are often prohibitively high for consumer applications, such as in households in the typical power range of 1 kW to 5 kW.

BACKGROUND OF THE INVENTION

A micro gas turbine having a compressor, a generator and a turbine is known from EP 1 564 379 A2. In this known gas turbine, the rotor of the generator comprises a shaft which is journaled in bearings which are part of the generator. The compressor shaft and the turbine shaft are coupled to the generator shaft.

The structural and rotordynamic requirements for the coupling between the generator and the compressor and turbine shafts are high because of the high rotational speed. The shafts also impose specific alignment requirements. They also limit the bearing type choice.

Electric motor assisted turbochargers are known from US 2008/0124233 and from US 2009/025386. These are not micro gas turbines. Yet, they incorporate an electrical machine between a compressor and a turbine. There is one bearing unit between the compressor and the electrical machine and another bearing unit between the turbine and the electrical machine. These known turbochargers imply custom design of the electrical machine, shaft-bearing system, compressor and turbine. This leads to high design, development and manufacturing costs.

SUMMARY OF THE INVENTION

It is an object of the present invention to provide a method for manufacturing a sufficiently inexpensive micro gas turbine for consumer, vehicular and other applications. The method according to the invention is characterized by:

- dividing an existing compressor-turbine unit into two separate parts being a compressor and a turbine;
- joining the compressor and turbine shafts together;
- taking two existing bearing units and connecting one of them to the compressor and the other to the turbine;
- manufacturing a generator housing with interfaces for connection with the bearing units or other stationary parts;
- mounting the stator of an existing generator into the generator housing;
- mounting the rotor of the existing generator on the joined shaft; and
- connecting the generator housing with the bearing units or other stationary parts.

In the method according to the invention the rotor of the generator is mounted on the compressor or rotor shaft. The generator has no bearings of its own and no shaft of its own. By using available turbochargers and generators with large production volumes—which are inexpensive, highly reliable and of high quality—and assembling them according to the method described above, a cost effective micro gas turbine can be derived. Such a micro gas turbine will not need a customary compressor, turbine, generator, shafts and bearings. The design, development and manufacturing of these parts require high costs and large effort. The derived micro gas turbine will not require coupling elements for the shafts and complex shaft alignment. This further reduces design, development, manufacturing and also operational/maintenance costs.

Energy input into the working cycle of the micro gas turbine can be implemented by adding either an internal burner, external burner with a heat exchanger or other customary means. The micro gas turbine can also incorporate different customary components to increase efficiency, thermal power, shaft and electrical power, as well as otherwise optimize its performance.

Apart from turbochargers, as mentioned above, inexpensive existing small jet engines, compressors and turbines for various applications—available both separately and joined in compressor-turbine units—can be used as elucidated in the present invention.

Typically, an existing compressor-turbine unit has a bearing unit. Then, according to the method in the present invention, this bearing unit is—preferably—taken as one of the required existing bearing units. Namely, when dividing the compressor-turbine unit into two separate parts, the bearing unit is left connected to one of the parts.

In one embodiment of the invention, the bearing units are identical. In case the compressor-turbine unit has only one bearing unit, an identical bearing unit has to be taken. The advantage is that both compressor and turbine shafts are then journalled in the bearings predesigned for them.

In another embodiment of the invention, the shaft of at least one of the parts is extended. This can be the turbine shaft. This provides the following advantage: The bearing units, generator and compressor can be mounted on the extended shaft. In this case no shaft joining is required. Should additional shaft length be required, a compressor shaft can be joined with the extended turbine shaft. Alternatively, the extended shaft can be the compressor shaft.

Extending the shafts can be done by adding a shaft section to the given shaft. The shaft can be also replaced with a longer shaft.

In a further embodiment of the invention, yet another existing compressor-turbine unit is taken in addition to the existing compressor-turbine unit mentioned in the description above.

A compressor, bearing unit and shaft are taken from one compressor-turbine unit. A turbine, bearing unit and shaft are taken from the other compressor-turbine unit. When the compressor and turbine shafts are joined together, there is sufficient space and shaft length for mounting a generator. No shaft extension is required.

As the micro gas turbine operates at high speeds with low torque transmission, simple procedures can be selected for joining the shafts according to various embodiments of the present invention. The shafts can be glued, tight fitted, joined by a screw thread or connected by other customary means.

Preferably, the bearing units used in the method according to the present invention incorporate a cooling system and a lubrication system. By using such bearing units, no design, development and manufacturing of separate cooling and lubrication systems are required for the derived micro gas turbine. This saves high costs and large effort. This also provides thermal management of the micro gas turbine, namely minimizes heat transfer to the compressor and the generator. Compressor and generator performance deteriorates greatly with heat addition. Even small deterioration in the performance of these components can greatly penalize the performance of a micro gas turbine and even make its operation none self-sustained.

In case any of the existing bearing units comprises more than one bearing, a further embodiment of the invention is characterized in removing at least one bearing from this bearing unit. This adds one manufacturing operation, yet saves substantial operational losses in the bearings. Should the derived micro gas turbine be left with only two bearings—as a result of this additional manufacturing operation—virtually any bearing types can be used.

BRIEF DESCRIPTION OF THE DRAWINGS

The invention will be further elucidated below on the basis of drawings. These drawings show an embodiment of the micro gas turbine manufactured according to the method in the present invention. In the drawings.

DETAILED DESCRIPTION OF THE DRAWINGS

Figure 1:
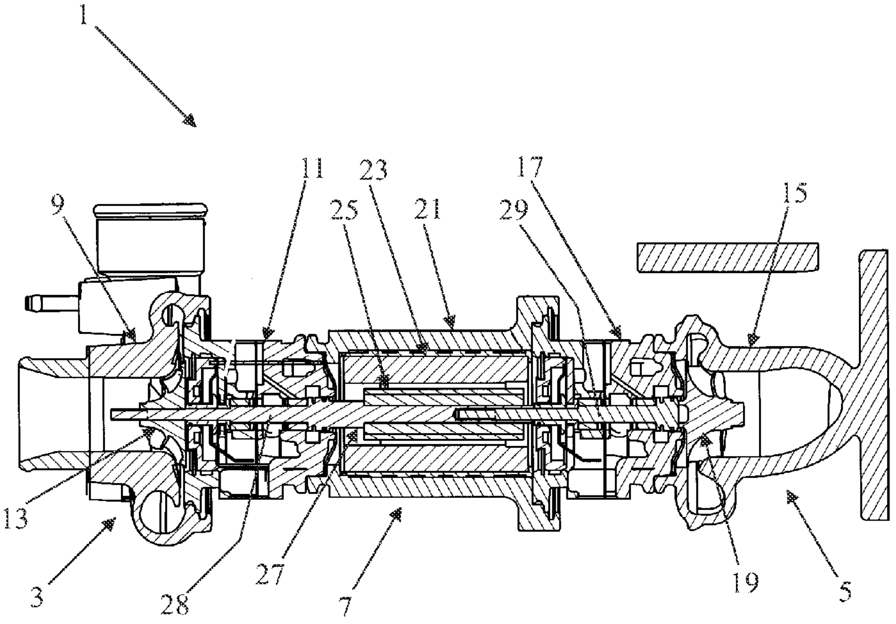
FIG. 1 is a sectional view of an embodiment of the micro gas turbine.
Figure 2:
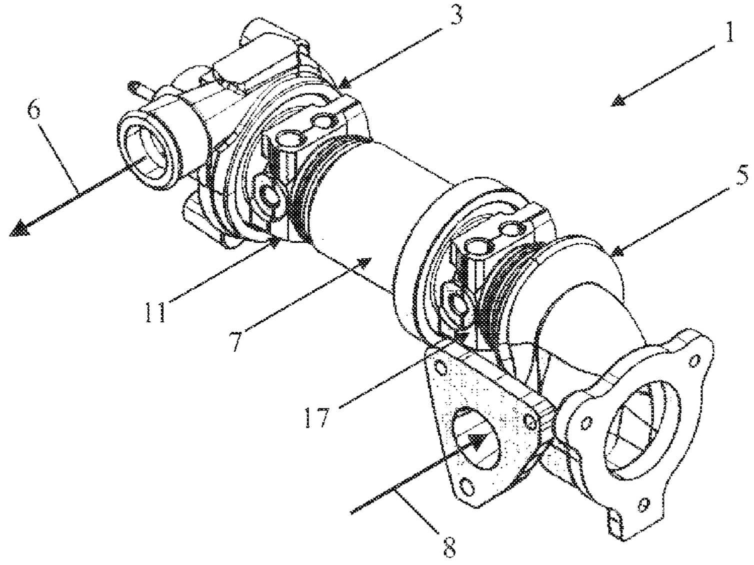
FIG. 2 is a perspective view of the micro gas turbine.

In FIGS. 1 and 2, an embodiment of the micro gas turbine manufactured according to the method in the present invention is shown in a sectional view and in a perspective view respectively. The micro gas turbine 1 comprises a compressor 3, a turbine 5 and a generator 7 mounted between these parts. A given working medium leaves the compressor 3 as shown by arrow 6. A given working medium enters the turbine 5 as shown by arrow 8.

Energy input into the working cycle of the micro gas turbine 1 can be implemented by adding either an internal burner, external burner with a heat exchanger or other customary means. The micro gas turbine 1 can also include different customary components to increase efficiency, thermal power, shaft and electrical power, as well as otherwise optimize its performance.

The compressor 3 has a compressor housing 9, a compressor bearing unit 11 connected to the compressor housing and a compressor rotor 13, which is journaled by the compressor bearing unit. The turbine 5 has a turbine housing 15, a turbine bearing unit 17 connected to the turbine housing and a turbine rotor 19 journalled by the turbine bearing unit.

The generator 7 has a generator housing 21, a stator 23 and a rotor 25.

The compressor bearing unit 11 is present between the compressor housing 9 and the generator housing 21. The turbine bearing unit 17 is present between the turbine housing 15 and the generator housing 21.

The rotor 25 of the generator 7 is rigidly connected to the compressor rotor 13 and the turbine rotor 19. No separate generator bearings are present, and the rotor 25 of the generator 7 is journalled by the bearing unit 11 of the compressor and the bearing unit 17 of the turbine. Apart from these two bearing units, the micro gas turbine 1 does not have other bearings.

The micro gas turbine has one common shaft 27. It results from joining a shaft section 28, which can be referred to as compressor shaft, and a shaft section 29, which can be referred to as turbine shaft. The generator rotor 25 is mounted on this shaft.

Although the present invention is elucidated above on the basis of the given drawings, it should be noted that this invention is not limited whatsoever to the embodiments shown in the drawings. The invention also extends to all embodiments deviating from the embodiments shown in the drawings within the context defined by the claims.

What is claimed is:

1. A method for manufacturing a micro gas turbine for generating electrical power, the method comprising the steps of:

(a) acquiring an existing compressor-turbine unit;

(b) disassembling the existing compressor-turbine unit into a compressor having a compressor shaft, and a turbine having a turbine shaft;

(c) extending either, or both, of the compressor shaft and the turbine shaft;

(d) joining the compressor shaft and the turbine shaft together to form a common shaft;

(e) providing two bearing units;

(f) connecting one of the bearing units to the compressor and the other of the bearing units to the turbine;

(g) manufacturing a generator housing with interfaces for connection with the two bearing units or other stationary parts;

(h) acquiring an existing generator;

(i) disassembling the existing generator to remove a stator and a rotor;

(j) mounting the stator of the existing generator in the generator housing;

(k) mounting the rotor of the existing generator on the common shaft, such that the combination of the compressor, the turbine, the common shaft, the stator, and the rotor, are suitable for generating power in the typical power range of 1 kW to 5 kW; and (1) connecting the generator housing with the two bearing units or other stationary parts.

2. The method according to claim 1, wherein at least one of the two bearing units is part of the existing compressor-turbine unit.

* * * * *